INVENTORS.
STANLEY R. PAVLICA
DONALD O. McCREIGHT
ELDON D. MILLER
BY
William C. Nedan
ATTORNEY

3,463,650
VITREOUS SILICA REFRACTORIES

Donald O. McCreight, Bethel Park, Eldon D. Miller, Bridgeville, and Stanley R. Pavlica, Irwin, Pa., assignors to Dresser Industries, Inc., Dallas, Tex., a corporation of Delaware
Continuation-in-part of application Ser. No. 431,977, Feb. 11, 1965. This application Feb. 13, 1967, Ser. No. 615,693
Int. Cl. C04b 35/14
U.S. Cl. 106—69    6 Claims

ABSTRACT OF THE DISCLOSURE

This invention is directed to a brick fabricated of a mixture of two different types of silica. One is volatilized silica and the other is a unique vitreous silica.

---

This application is a continuation-in-part of application Ser. No. 431,977, now abandoned, filed Feb. 11, 1965 and assigned to the present assignees and claims the benefits outlined under 35 U.S.C. 120.

The present invention relates to a novel vitreous silica aggregate and more particularly, to refractory compositions embodying the same.

Heretofore, many prior workers have produced and utilized in refractory compositions amorphous forms of silica which may be characterized generally as volatilized silica and fused silica. Volatilized silica, also known as fume silica, is silica which has been deposited from a vapor phase. Canadian Patent 467,555 to Austin, discloses several methods of recovering such an amorphous silica from the vapor phase. United States Patents 3,060,043, to Renkey and 3,144,345, to McCreight, et al., disclose the use of minor amounts of volatilized silica in refractory compositions. The latter United States patent refers to the volatilized silica as being "nonvitreous." The production of volatilized silica requires costly processing and recovery equipment.

Fused silica is an amorphous form of silica that is produced by heating a silica raw material to temperature above the equilibrium melting point of silica (3140° F.) which is, in fact, the melting point of the high temperature stable form of silica, cristobalite. After the silica becomes liquid, it is rapidly cooled to avoid recrystallization. United States Patent 2,874,071 to Kadisch, discloses a refractory castable containing a predominant proportion of fused silica produced by the method noted above. United States Patent 1,969,751 to Heuer, discloses a vitreous crystalline silica aggregate wherein a silica raw material is heated above the melting temperature of silica and then slowly cooled to recrystallize or devitrify the material. Fusing silica is an expensive process also, since the high temperatures required for melting have dictated, in general, the use of electric furnaces.

We have discovered a novel vitreous silica aggregate containing cristobalite in an amount not exceeding about 15% for use in refractory compositions. We have produced this material by heating quartz materials below the melting point of cristobalite, in a rotary kiln, at fast heating rates and under conditions which indicate we have commercially achieved the direct vitrification to quartz without going through the cristobalite phase. This process is the subject matter of United States Patent No. 3,314,758, issued June 20, 1967 assigned to a common assignee and is incorporated herein by reference.

We believe that our success results from our realization that at temperatures in excess of 1250° C., quartz decomposes at a finite rate, not instantaneously, to the disorganized or amorphous state, the rate being determined by the crystal size and the temperature and, probably, also by chemical composition, i.e., the nature and amount of impurities. The formation of cristobalite, from the disorganized amorphous state, also proceeds at a rate dependent on temperature and chemical composition, which rate is somewhat different than the rate of decomposition of quartz. Both reactions appear to increase in rate with increasing temperature between 1250° C. and 1700° C. the former increasing more rapidly than the latter.

Accordingly, it is among the objects of the present invention to provide refractory compositions containing a novel vitreous silica refractory aggregate.

Other objects of the invention will be apparent from the detailed description given hereinafter.

Figure 1:
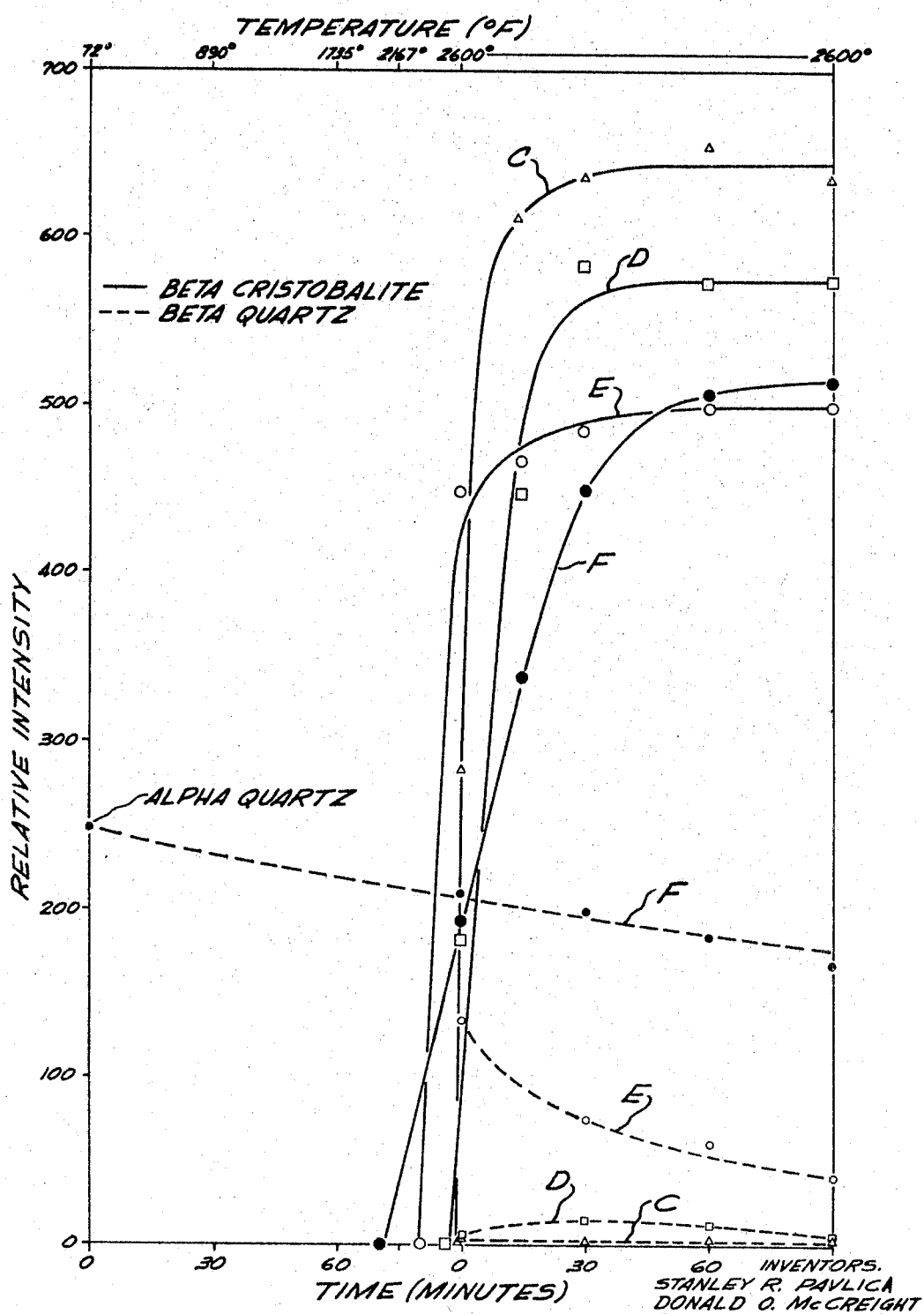
FIG. 1 is a graph containing curves showing the typical devitrification rate of the vitreous silica aggregate in the product of the invention and the rates for several commercially fused silicas.

Briefly, in accordance with the present invention, there is provided a vitreous silica refractory shape made from a batch consisting essentially of a sedimentary quartzite material occurring naturally in massive form, having an average crystallite diameter of about 10 microns and less and containing a negligible intercrystalline material, said quartzite material having been rapidly heated to a temperature above the equilibrium melting point of quartz but below the equilibrium melting point of silica, for a sufficient period of time to decompose the crystalline structure and provide an amorphous state in said material and then rapidly cooled to obtain a vitreous silica aggregate containing no more than about 15% cristobalite.

Refractory shapes may be termed chemically bonded or ceramically bonded. The chemically bonded shapes are green or unfired shapes, and are put into service in this form. Ceramically bonded shapes are shapes which have been subjected to elevated burning or firing temperatures, to obtain a ceramic bond throughout the particulate material from which the shape is fabricated. This invention relates to both types.

More particularly, the vitreous silica aggregate is prepared by charging the silica raw material to a rotary kiln, heating continuously at the rate of at least about 25° F. per minute to a temperature of between 2900° F. and 3100° F., holding the material thereat for a period of about ½ to 1½ hours, then cooling the resulting product to a temperature below about 2000° F. rapidly, preferably, at a rate of about 200° F. per minute.

According to one embodiment of the present invention, there is provided a burned (ceramically bonded) refractory brick having relatively good thermal shock and acid resistance and high strength made from a batch consisting of, by weight, at least about 90% vitreous silica and from 1 to 10% of volatilized silica.

In another embodiment of the invention, there is provided, an unburned (chemically bonded) refractory brick consisting of, by weight, at least 90% vitreous silica, from 1 to 10% volatilized silica and from about 1 to 5%, based on a total weight of the batch, of a bonding agent. Preferred bonding agents are magnesium phosphate, sodium phosphate, aluminum phosphate and lignin liquor.

The volatilized silica employed herein is a well-known pressing aid and is intended to mean silica which has been deposited from a vapor phase as was mentioned previously in the discussion of the prior art. Such a volatilized silica is a by-product of the reduction of silica to form silicon alloys, such as ferrosilicon. It has also been produced by reducing quartzite with carbon, treating the vaporous products of reduction with air or other oxygen yielding gas, and condensing the silica in finely divided form. As used, it is generally all finer than 50 microns, with at least half of it finer than 1 micron in size. The volatilized silica normally analyzes about 95% $SiO_2$, with about 2 to 3% of $FeO+MgO+Al_2O_3$ and about 2% ignition loss.

In order to demonstrate the superiority of our novel vitreous silica aggregate over commercially obtainable fused silica aggregates, devitrification tests were run at 2250 and 2550° F. The commercial samples have been designated A and B, for convenience. Both fused silica samples were produced by heating high purity silica sands in an electric arc furnace at temperatures above 3500° F. In a chemical analysis, both commercial samples contained in excess of 99.5% $SiO_2$. Our vitreous silica aggregate typically analyzes about 99%+ $SiO_2$; however, the $SiO_2$ content may be as low as 98% depending on the amount of $Al_2O_3$ picked up in the aforementioned rotary kiln process.

Samples of the three silica aggregates were ground to approximately 6 microns average particle size (Fisher), briquetted at about 3000 p.s.i. and heated in the X-ray furnace under the conditions indicated in Table I.

TABLE I

|  | Vitreous silica hours | Commercial fused silica A | Commercial fused silica B |
|---|---|---|---|
| Mineral composition (X-ray): |  |  |  |
| Quartz, percent | None | None | None |
| Cristobalite, percent | 10 | 1 | 1 |
| Amorphous (glass) percent by difference | 90 | 99 | 99+ |
| Devitrification test in X-ray furnace |  |  |  |
| Composition after 1 hour at 2,550° F.: |  |  |  |
| Quartz, percent | None | 3 | None |
| Cristobalite, percent | 52 | 53 | 85 |
| Amorphous (glass), percent by difference | 48 | 44 | 15 |
| Composition after 6 hours at 2250° F.: |  |  |  |
| Quartz, percent | None | 12 | Trace |
| Cristobalite, percent | 28 | 29 | 43 |
| Amorphous (glass), percent by difference | 72 | 59 | 57 |

The table shows that in the devitrification tests in the X-ray furnace at 2250 and 2550° F., the vitreous silica showed less devitrification to cristobalite (i.e., the aggregate had about 70% vitreous silica remaining after about 6 hours at 2250° F. than either of the commercial electrically fused materials even though it originally had a higher cristobalite content. This difference is remarkable and was totally unexpected.

In further tests, to differentiate the vitreous silica aggregate employed in the shapes of the invention from commercial fused silica, several samples of the latter were obtained and examined. These samples were designated C, D and E. C was optical grade fused quartz and appeared clear, transparent, free of voids, with glassy luster and conchoidal fracture. D was light gray, transparent, with glassy luster and conchoidal fracture and contained abundant small spherical vesicles (bubbles). E was medium gray, translucent, vesicular, with glassy luster and conchoidal fracture. The vitreous silica aggregate employed in the invention was designated sample F and appeared white opaque, with waxy to glassy luster and smooth to conchoidal fracture and closely resembled milk quartz.

An X-ray diffraction analysis was performed on the vitreous silica employed in the product of the subject application and the commercial fused silicas indicated above. This analysis is shown below:

X-RAY DIFFRACTION ANALYSIS

| Mineralogical analysis | Material, percent | | | |
|---|---|---|---|---|
|  | C | D | E | F, Vitreous silica of subject application |
| Noncrystalline [1] | 100.0 | 99.2 | 99.5 | 86.0 |
| Cristobalite |  | 0.8 | 0.5 | 8.5 |
| Quartz |  |  |  | 5.5 |

[1] Calculated by difference.

The results show the vitreous silica employed in the product of the subject application to be different mineralogically from the commercian fused silicas shown. Note that E and D contain less than 1% of cristobalite, and that C is free of crystalline components; whereas, the vitreous silica aggregate, F, contains 5.5% quartz, which is not present in any of the commercial fused silicas compared.

In addition, the devitrification rate of the vitreous silica aggregate used in the product of the subject application and the commercial fused silicas was determined using high-temperature X-ray diffraction techniques. This was accomplished by plotting the change in the relative intensity of diffraction lines of beta cristobalite and beta quartz for each of the samples at a temperature of 2600° F. during a 90-mintue period. On these plotted points, curves were drawn for each of the material. From these curves the slope was calculated, which is the devitrification rate for each of the materials. FIG. 1 containing the plotted curves shows that the vitreous silica employed in the product of the subject application F, has a slower devitrification rate than the fused silica samples, C and D, and E tested.

In another series of comparative tests, a plurality of unburned brick mixes were formed of the materials shown in Table II using our vitreous silica aggregate and commercial fused silica aggregate A. All of the brick were pressed at 8000 p.s.i. and dried at 250° F. Tests included strength after reheats at 1000° F. and 2000° F., devitrification at 2250° F., and a water quench tests for thermal shock resistance. The quench test, made on 9″ straights (brick nominally 9 x 4½ x 3½ inches), consisted of five cycles of alternate heating to 2000° F. and quenching in water.

TABLE II

|  | 1 | 2 | 3 | 4 |
|---|---|---|---|---|
| Mix: |  |  |  |  |
| Vitreous silica, percent | 90 |  | 98 |  |
| Commercial fused silica A, percent |  | 90 |  | 98 |
| Volatilized silica | 10 | 10 |  |  |
| Ball clay |  |  | 2 | 2 |
| Lignin liquor | 5 | 5 | 5 | 5 |
| After drying: |  |  |  |  |
| Modulus of rupture, p.s.i. | 380 | 190 | 610 | 490 |
| Crushing strength, p.s.i. | 2,020 | 1,840 | 1,910 | 1,840 |
| After 1,000° F. reheat: |  |  |  |  |
| Modulus of rupture, p.s.i. | 200 | 190 |  |  |
| Crushing strength, p.s.i. | 1,250 | 950 |  |  |
| After 2,000° F reheat: |  |  |  |  |
| Modulus of rupture, p.s.i. | 310 | 160 | 220 | 70 |
| Crushing strength, p.s.i. | 1,770 |  | 870 | 690 |
| After 2,000° F Quench test: |  |  |  |  |
| Modulus of rupture, p.s.i. | 230 |  | 250 |  |
| Appearance | No cracks | Cracked | No cracks | Cracked |
| X-ray test on reheated brick after 5 hours at 2,250° F.: |  |  |  |  |
| Cristobalite, percent | 21 | 35 | 20 | 29 |
| Quartz, percent | 3-4 | 17 | N.D. | 18 |
| Amorphous (glass), percent | 75 | 48 | 80 | 53 |

N.D. None detected.

The above table shows that the vitreous silica brick had superior strength and resistance to thermal shock and cristobalite formation than did the mixes containing commercial fused silica.

In other tests, two mixes were prepared, Mix H containing 90% vitreous silica, 10% V.S. silica, and 5% based on a total weight of the batch, of aluminum phosphate, and Mix J, containing 90% vitreous silica, 8% volatilized silica, 2% ball clay, and 5% of 75% phosphoric acid. Brick were prepared in the same manner as the brick of Table II. The brick were tested after drying and a 1000° F. reheat, for modulus of rupture and crushing strength. In both of these tests Mix H showed higher values. After a 2000° F. reheat, Mix H had a crushing strength of almost 300 p.s.i. greater than Mix J. After 2900° F. reheat, Mix H appeared satisfactory; but Mix J bloated badly. The bloating is believed to have been caused by the release of water vapor in the reaction between the phosphoric acid and $SiO_2$ at elevated temperatures, which reaction does not occur when using aluminum phosphate. Sodium phosphate and magnesium phosphate would react similarly to aluminum phosphate as a bonding material for vitreous silica in unburned brick manufacture.

Figure 2:
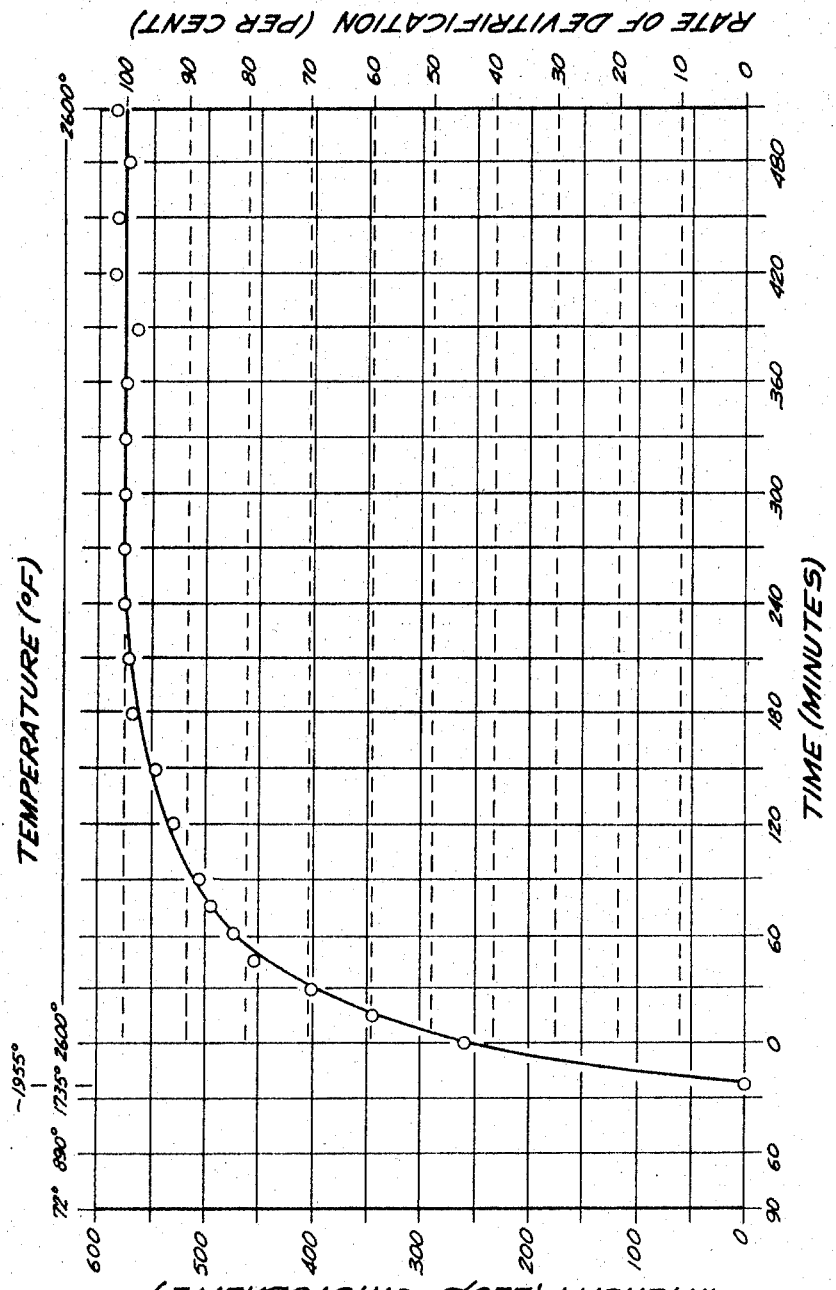
FIG. 2 is a graph containing a curve showing the typical devitrification rate at 2600° F. of brick according to the invention.

Testing was continued to determine the properties of burned vitreous silica brick and two batches were prepared containing 90% vitreous silica, 10% volatilized silica, 1% lignin liquor and 3% water. Both batches were pressed at 8000 p.s.i. into brick. Batch X was burned on a schedule of 100° per hour to 1800° F with a 10 hour hold. Batch Y was burned on a similar schedule to 2000° F. with a 10 hour hold. The brick were tested for strength after cooling, and after a reheat at 2910° F. Tests also included a devitrification test (including a devitrification rate test conducted in the manner mentioned previously) and a water quench test for thermal shock resistance. The results are indicated in Table III below. The devitrification rate is shown in FIG. 2.

TABLE III

| Mix | X | Y |
|---|---|---|
| Bulk density, pcf | 115 | 116 |
| Modulus of rupture, p.s.i | 780 | 690 |
| Crushing strength, p.s.i | 4,210 | 4,310 |
| Reheat 2,910° F.: | | |
| Modulus of rupture, p.s.i | 580 | 830 |
| Appearance | No bloating, deformation or cracking | |
| 2,000° F. quench test (water quench, 5 cycles): | | |
| Modulus of rupture | 760 | 710 |
| Appearance | No cracking | |
| X-ray analysis after burning: | | |
| Cristobalite, percent | 3+ | 3+ |
| Quartz, percent | 1 | 1 |
| Amorphous (glass), percent | 95 | 95 |

The above test results show both brick to have excellent strength and thermal shock resistance and minimal devitrification. The brick were also tested for acid resistance which was found to be good.

A typical screen analysis (Tyler) for the brick mixes of Tables II and III is about as follows: −8 +10 mesh, 10%; −10 +28 mesh, 20%; −28 +65 mesh, 20%; −65 mesh, about 50% with about 40% of the total batch being −150 mesh. While the invention has been described with reference to particular embodiments and examples, it will be understood, of course, that modifications, substitutions and the like may be made therein without departing from its scope.

Having thus described the invention in detail and with sufficient particularity as to enable those skilled in the art to practice it, what is desired to have protected by Letters Patent is set forth in the following claims.

We claim:

1. A silica refractory shape made from a batch consisting essentially of a vitreous silica aggregate containing cristobalite, said cristobalite being present in an amount not exceeding 15%, and from 1 to 10% by weight, of volatilized silica, said shape having good resistance to thermal shock evidenced by freedom from cracking after five cycles of alternate heating to 2000° F. and quenching in water, said shape having good resistance to devitrification as evidenced by amount of additional cristobalite formation after being subjected to an elevated temperature.

2. The shape of claim 1 in which the vitreous silica aggregate has a devitrification rate at about 2600° F. according to curve F of FIGURE 1.

3. The shape of claim 1, which has a devitrification rate at about 2600° F. according to the curve of FIGURE 2.

4. The shape of claim 1 in which the vitreous silica aggregate has good resistance to thermal shock as evidenced by freedom from cracking after five cycle of alternate heating to 2000° F. and quenching in water and in which the aggregate has relatively good resistance to devitrification wherein the grain contains at least about 70% vitreous silica after heating for about six hours at 2250° F.

5. A shape according to claim 1 which is burned.

6. A shape according to claim 1 which is unburned and contains in addition from about 1 to 5% of a bonding agent based on the total weight of the batch.

References Cited

UNITED STATES PATENTS

| | | | |
|---|---|---|---|
| 2,874,071 | 2/1959 | Kadisch et al. | 106—69 |
| 2,973,278 | 2/1961 | Kadisch et al. | 106—69 |
| 3,144,345 | 8/1964 | McCreight et al. | 106—69 |
| 3,314,758 | 4/1967 | Scott et al. | 106—69 |

FOREIGN PATENTS 467,555  8/1950  Canada.

JAMES E. POER, Primary Examiner